United States Patent
Ball et al.

(10) Patent No.: US 7,185,529 B2
(45) Date of Patent: Mar. 6, 2007

(54) SHOWER STATION TESTING ASSEMBLY FOR PRESSURE TESTING PLUMBING

(75) Inventors: William T. Ball, Colorado Springs, CO (US); Duane Condon, Ramona, CA (US)

(73) Assignee: WCM Industries, Inc., Colorado Springs, CO (US)

( * ) Notice: Subject to any disclaimer, the term of this patent is extended or adjusted under 35 U.S.C. 154(b) by 505 days.

(21) Appl. No.: 10/370,545

(22) Filed: Feb. 20, 2003

(65) Prior Publication Data

US 2004/0163446 A1 Aug. 26, 2004

(51) Int. Cl.
*G01M 3/02* (2006.01)
*G01M 3/08* (2006.01)

(52) U.S. Cl. .......................... 73/40.5 R; 73/37; 73/40; 73/46; 73/49.3; 4/255.08; 4/695; 4/696

(58) Field of Classification Search ............... 73/37, 73/40, 40.5 R, 46, 49.1–49.3, 49.8, 48.8; 4/255.01, 255.07, 255.08, 596, 601, 605, 4/287, 288, 293, 295, 696, 695
See application file for complete search history.

(56) References Cited

U.S. PATENT DOCUMENTS

| | | | | |
|---|---|---|---|---|
| 608,207 A | * | 8/1898 | Merritt | 285/191 |
| 917,717 A | * | 4/1909 | Diedrick | 4/225.08 |
| 952,240 A | | 3/1910 | Deming | 4/255.07 |
| 964,954 A | * | 7/1910 | Coles | 4/255.08 |
| 1,013,175 A | * | 1/1912 | Jones | 134/166 C |
| 1,173,710 A | * | 2/1916 | Crocker et al. | 134/166 C |
| 1,173,854 A | * | 2/1916 | Pearch | 4/255.08 |
| 1,528,081 A | * | 3/1925 | Schermerhorn et al. | 134/166 C |
| 1,760,704 A | * | 5/1930 | Lindstrom | 134/166 C |
| 1,893,979 A | * | 1/1933 | Barrere | 134/166 C |
| 2,016,498 A | * | 10/1935 | Hopewell | 4/255.07 |
| 2,036,614 A | | 4/1936 | Tharp | 4/255.07 |
| 2,045,731 A | * | 6/1936 | Solari | 4/255.07 |
| 2,045,732 A | * | 6/1936 | Solari | 4/255.07 |
| 2,059,532 A | * | 11/1936 | Nagel | 4/255.08 |
| 2,061,553 A | * | 11/1936 | Acosta | 134/166 C |
| 2,197,716 A | * | 4/1940 | Whitaker | 4/255.08 |
| 2,462,752 A | * | 2/1949 | Kotches | 239/312 |
| 2,966,311 A | * | 12/1960 | Davis | 239/273 |
| 2,992,437 A | * | 7/1961 | Nelson et al. | 4/670 |
| RE25,175 E | * | 5/1962 | Nelson et al. | 4/670 |
| 3,608,098 A | * | 9/1971 | Andrisani | 4/255.04 |
| 4,238,860 A | * | 12/1980 | Dixon | 4/255.08 |
| 4,542,642 A | | 9/1985 | Tagliarino | 73/40.5 R |
| 4,763,510 A | | 8/1988 | Palmer | 73/40.5 R |
| 5,076,095 A | | 12/1991 | Erhardt | 73/49.8 |
| 5,257,648 A | | 11/1993 | Oropallo | 138/90 |
| 5,495,750 A | | 3/1996 | Dufresne | 73/49.1 |
| 5,497,514 A | * | 3/1996 | Miller | 4/255.04 |
| 5,497,516 A | | 3/1996 | Irwin | 4/694 |

(Continued)

*Primary Examiner*—Hezron Williams
*Assistant Examiner*—David A. Rogers

(57) ABSTRACT

The present invention provides a testing assembly for pressure testing a plumbing system in a building where the building has a shower station with a drain and a shower inlet. The testing assembly includes a drain adapter, a hose fitting on the shower inlet, and a hose removably connecting the shower inlet and the drain adapter. The drain adapter has a hose end fitting and a drain sealing element in fluid communication with the hose end fitting. The sealing element is adapted to be in fluid communication with the drain.

3 Claims, 6 Drawing Sheets

U.S. PATENT DOCUMENTS

| | | | |
|---|---|---|---|
| 5,509,148 A * | 4/1996 | Steele et al. | 4/255.01 |
| 5,581,018 A | 12/1996 | Allen et al. | 73/49.8 |
| 5,682,620 A * | 11/1997 | Stoltz et al. | 4/255.04 |
| 5,740,830 A | 4/1998 | Mankins | 137/15.07 |
| 6,098,212 A * | 8/2000 | Rogan | 4/255.04 |
| 6,185,755 B1 * | 2/2001 | Shepherd et al. | 4/255.06 |
| 6,205,594 B1 * | 3/2001 | Solaberry | 4/255.04 |
| 6,295,659 B1 * | 10/2001 | Sandness | 4/255.01 |
| 6,378,912 B1 | 4/2002 | Condon et al. | 285/220 |
| 6,510,860 B2 * | 1/2003 | Kihs | 134/166 C |
| 2002/0032926 A1 * | 3/2002 | Lewis | 4/680 |

* cited by examiner

SHOWER STATION TESTING ASSEMBLY FOR PRESSURE TESTING PLUMBING

BACKGROUND OF THE INVENTION

In new building construction, the plumbing system needs to be checked for leaks before an inspection process is completed. This test involves sealing off outlets such as drains. When the testing operation is to take place, a plug is put in the bottom drain of a shower station/bathtub and a seal plate is placed at the end of the shower on the overflow drain, if one is present as in a shower station/bathtub arrangement. Then water is run down a vent in the plumbing system until the water reaches a level above all of the plumbing system outlets. The plumber or inspector then determines whether any of the piping leaks.

The water supplied for this test is typically obtained by the plumber getting on the roof of the building, and using a hose to run water down the top of the vent pipe of the plumbing system. Running a hose up to the roof is a cumbersome, hazardous and time intensive procedure which often results in wasting large amounts of water.

It is therefore an object of this invention to provide a testing assembly for pressure testing plumbing systems which eliminates the need to run water through the roof vent.

A further object of the invention is to provide a testing assembly which utilizes an inlet and a drain of a shower station to pressure test plumbing systems.

A still further object of the invention is to provide a testing assembly having a drain adapter which allows for a watertight connection between the shower station inlet and drain.

These and other objects will be apparent to those skilled in the art.

SUMMARY OF THE INVENTION

The present invention provides a testing assembly for pressure testing a plumbing system in a building where the building has a shower station with a drain and a shower inlet. The testing assembly includes a drain adapter, a hose fitting on the shower inlet, and a hose removably connecting the shower inlet and the drain adapter. The drain adapter has a hose end fitting and a drain sealing element in fluid communication with the hose end fitting. The sealing element is adapted to be in fluid communication with the drain.

DESCRIPTION OF THE PREFERRED EMBODIMENT

Figure 1:
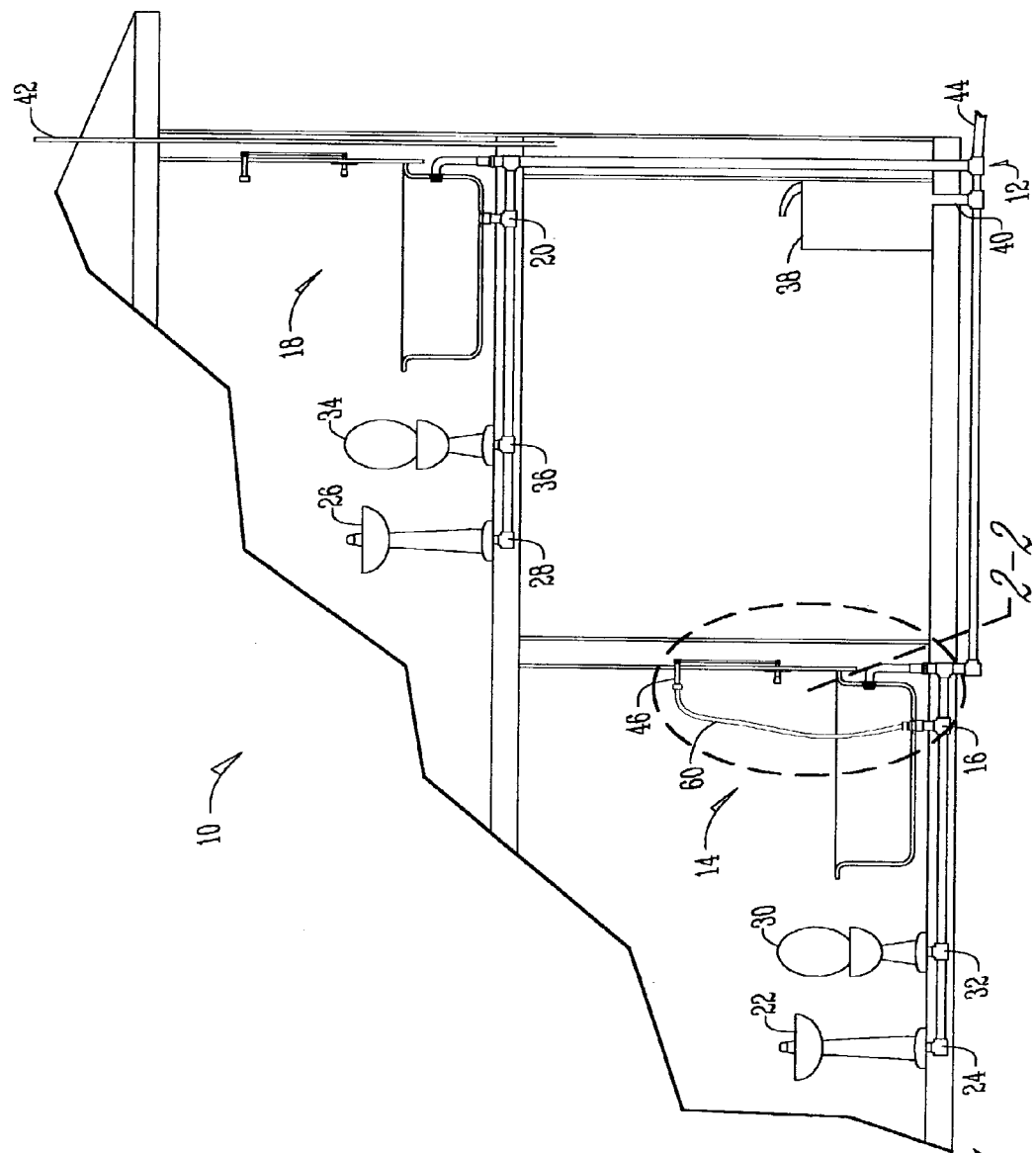
FIG. 1 is a sectional side view of a plumbing system environment utilizing the device of this invention.

With reference to FIG. 1, a building 10 with a plumbing system 12 has a first shower station 14 and bottom drain 16; second shower station 18 and drain 20; first lavatory sink 22 and drain 24; second lavatory sink 26 and drain 28; first toilet 30 and drain 32; second toilet 34 and drain 36; kitchen sink 38 and drain 40; vent 42; and plumbing outlet 44.

In the conventional pressure testing of the plumbing system 12, the drains 16, 20, 24, 28, 32, 36, 40, and outlet 44 are all sealed to fluid flow. Then water is added to the plumbing system 12 via vent 42 to check for leaks in the system 12.

In the present invention, however, drain 16 is not sealed to fluid flow; rather it is placed in fluid flow communication with a first shower inlet 46 to supply fluid to the sealed plumbing system 12.

It will be understood by those skilled in the art that the term shower inlet, as used herein, includes but is not limited to shower spouts, bath spouts, or one of these spouts fitted with any transitional fitting (which may be used to prevent damage to the finished spout).

Figure 3:
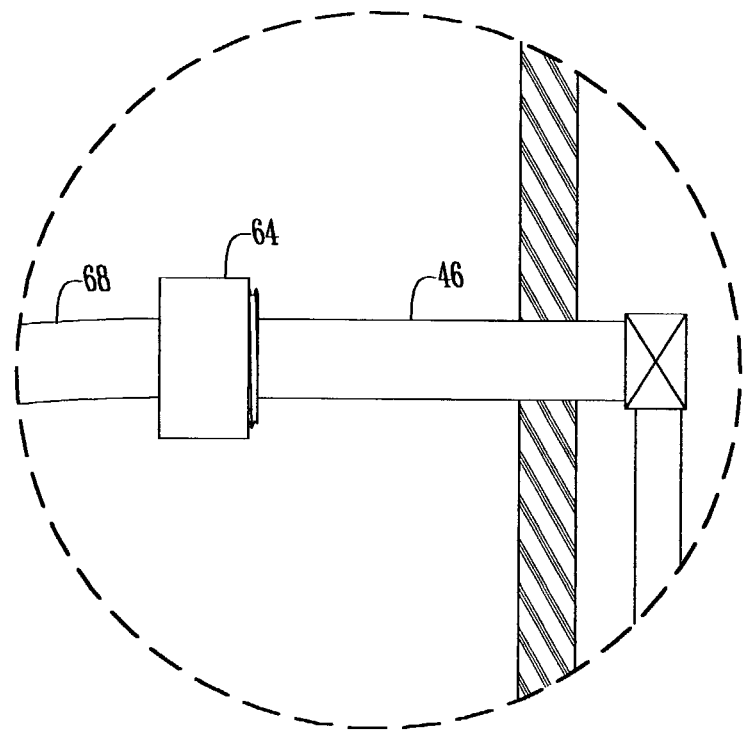
FIG. 3 is an enlarged side view of the upper connector of this invention taken on line 3—3 of FIG. 2.
Figure 3A:
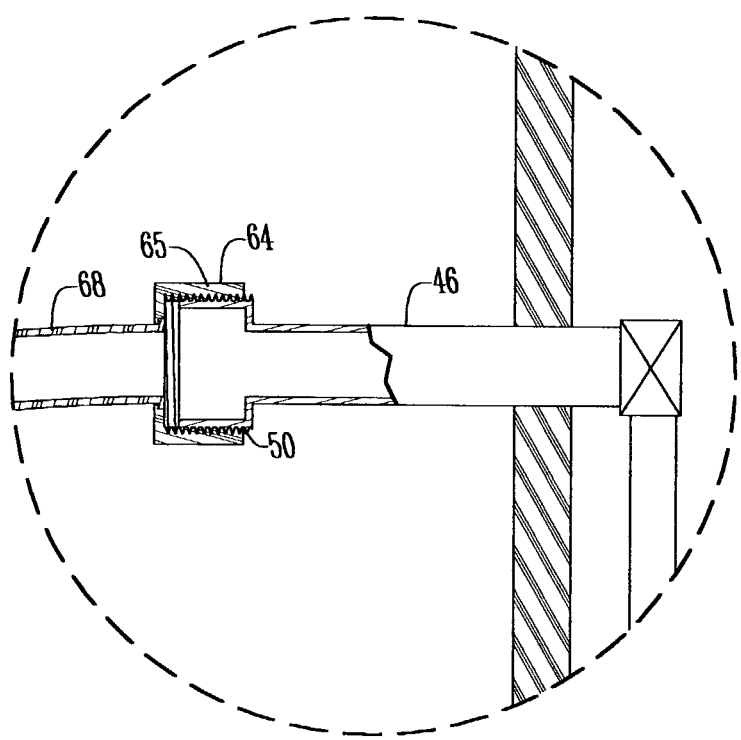
FIG. 3A is a sectional side view of the upper connector of this invention taken on line 3—3 of FIG. 2.

With reference to FIG. 1 and FIG. 3A, the first shower inlet 46 is equipped with threaded head 50 (also referred to as hose fitting 50).

Figure 2:
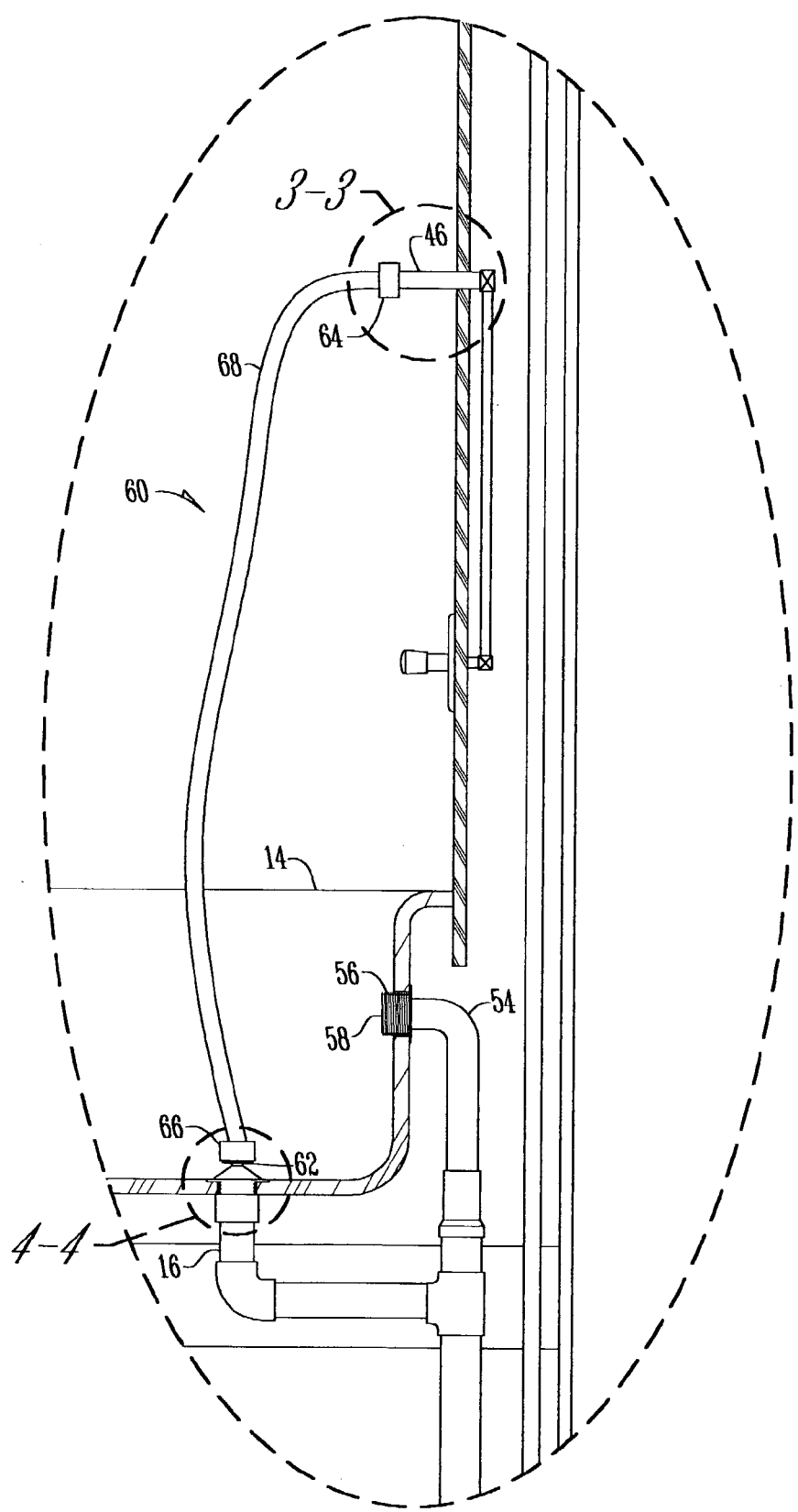
FIG. 2 is a side view of a shower station environment utilizing the device of this invention with a shower bottom drain taken on line 2—2 of FIG. 1.

With reference to FIG. 2, the shower station 14 further includes an overflow drain 54. In one embodiment, the overflow drain 54 is equipped with a threaded surface 56 (further discussed below in regards to FIGS. 5 and 6). In the present embodiment, where the first shower inlet 46 is placed in fluid flow communication with bottom drain 16, the overflow drain 54 includes a seal 58 preventing outward fluid flow during pressure testing.

Testing assembly 60 provides an apparatus for placing the first shower inlet 46 in fluid flow communication with bottom drain 16. Testing assembly 60 includes a bottom drain adapter 62 adapted to removably engage bottom drain 16 in fluid flow communication to form a watertight seal; an upper connector 64 having a threaded surface 65 adapted to removably engage the threaded head 50 to form a watertight seal; a lower connector 66 having a threaded surface 67 removably engaged in with the drain adapter 62 to form a watertight seal; and a hose 68 connected in fluid flow communication between the upper and lower connectors 64 and 68.

Figure 4:
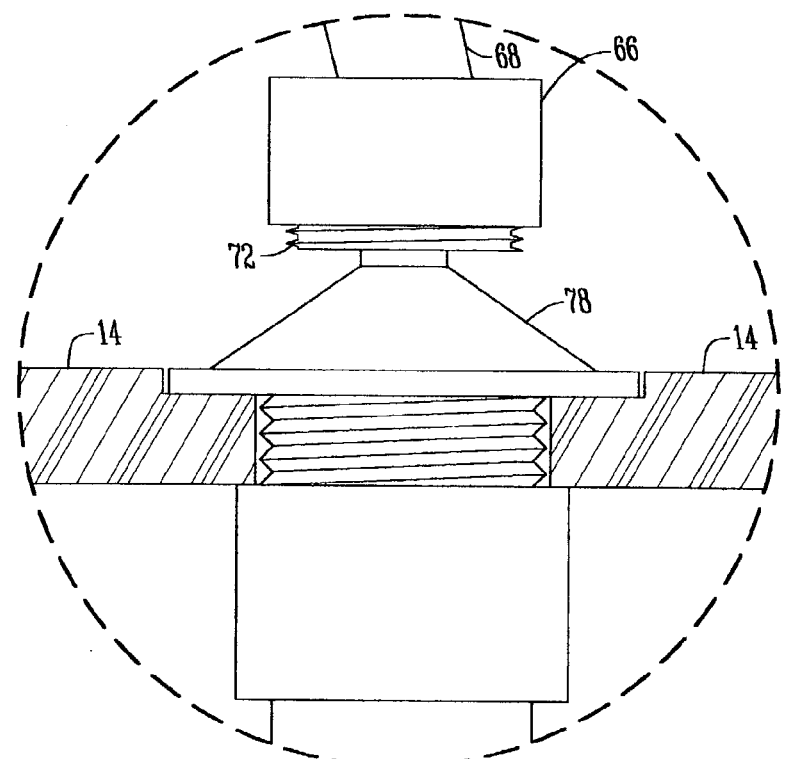
FIG. 4 is an enlarged side view of the drain adapter of this invention for use with a bottom drain taken on line 4—4 of FIG. 2.
Figure 4A:
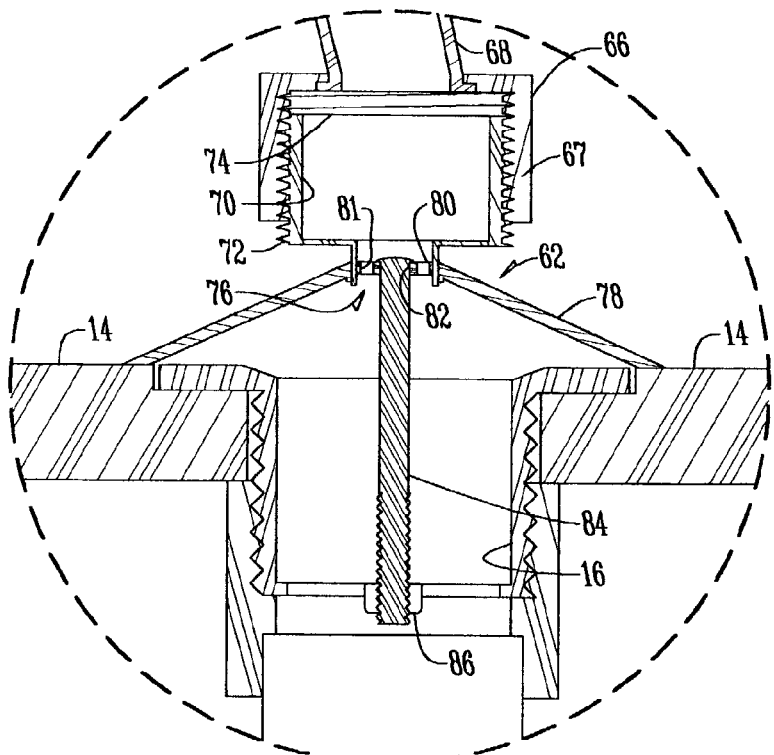
FIG. 4A is an enlarged sectional side view of the drain adapter of this invention for use with a bottom drain similar to that of FIG. 4.

With reference to FIG. 4A, a slightly modified bottom drain adapter 62 is shown in greater detail. The adapter 62 includes a hose end fitting 70 with a threaded portion 72 for removably engaging the threaded surface 67 of lower connector 66 to form a watertight seal, an inlet 74 for accepting fluid from the shower inlet 46, and an outlet 76 for flow of fluid to the drain 16. The adapter 62 further includes a flexible sealing element 78 attached about the hose end fitting 70, for creating a watertight seal between the hose end fitting 70 and the bottom of the shower station 14. It will be understood that the flexible sealing element 78 may seal to either the drain 16 or to the shower station 14. A perforated base 80 is attached within the hose end fitting 70. The perforated base 80 has perforations 81 for allowing fluid flow through the base 80, and an aperture 82 for slidably receiving a fastener 84. The fastener 84 is adapted to removably secure the drain adapter 62 to the drain 16 by mating with a threaded surface 86 on drain 16, and to create a water tight seal between the sealing element 78 and drain 16.

Figure 5:
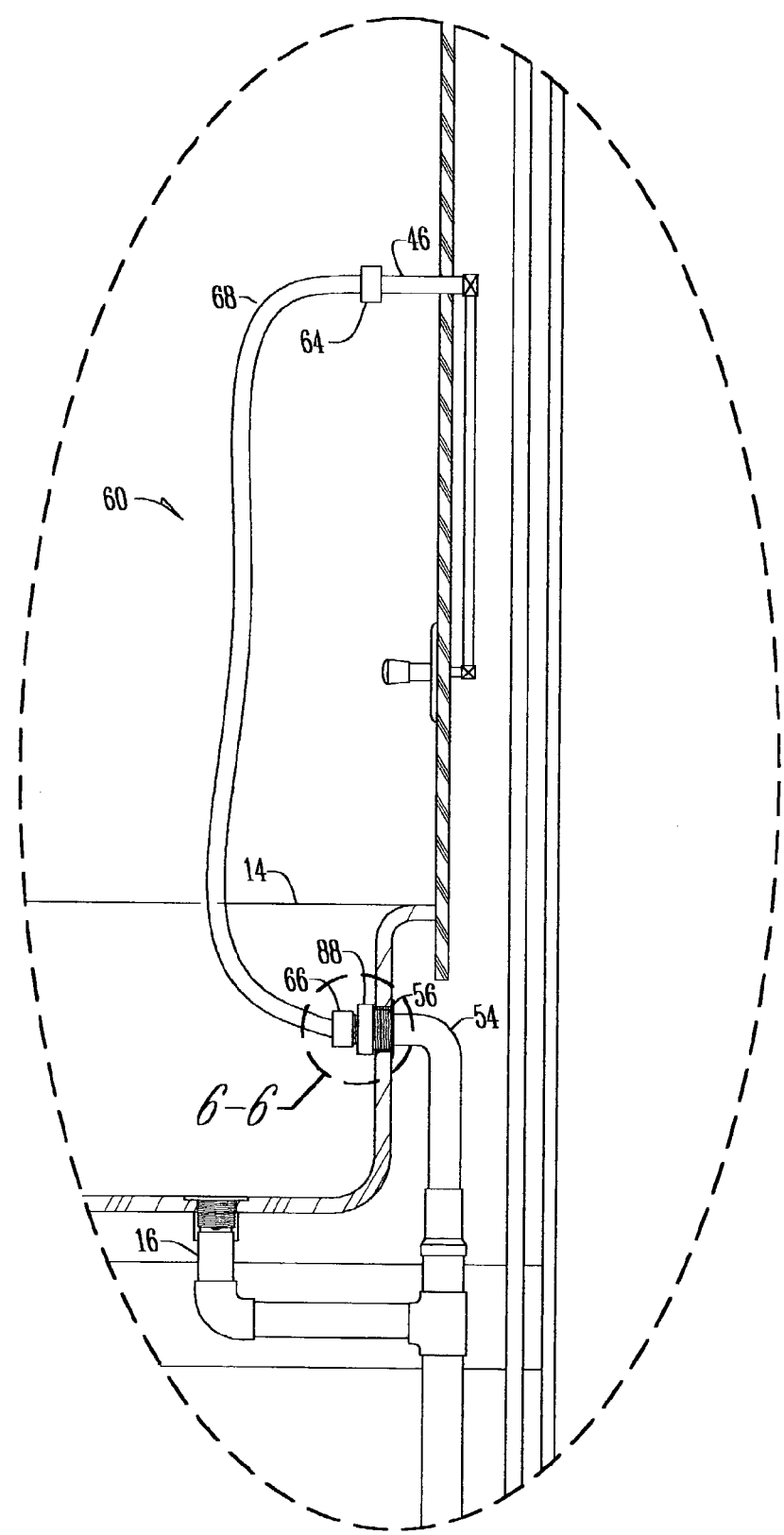
FIG. 5 is a side view of a shower station environment utilizing the device of this invention with a shower overflow drain.
Figure 6:
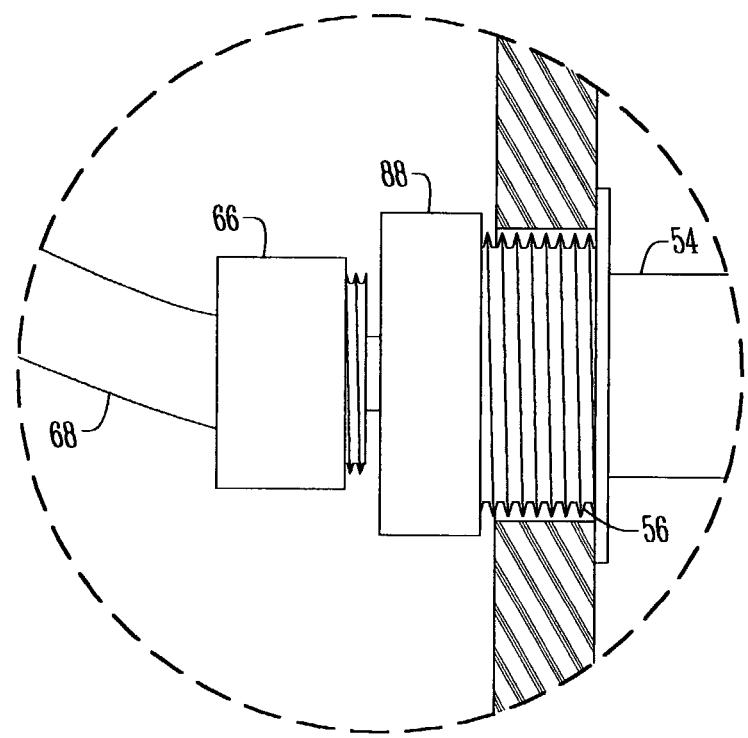
FIG. 6 is an enlarged side view of the drain adapter of this invention for use with an overflow drain taken on line 6—6 of FIG. 5.

With reference to FIG. 5, in an alternate embodiment, drain 16 is sealed and the testing assembly 60 is removably secured in fluid flow communication between the shower inlet 46 and the overflow drain 54. In this embodiment, the hose 68 is attached from the inlet 46 to the overflow drain 54. The hose 68 is attached to the overflow drain 54 via an overflow drain adapter 88. The adapter 88 is adapted to be removably engaged in fluid communication with the overflow drain 54.

Figure 6A:
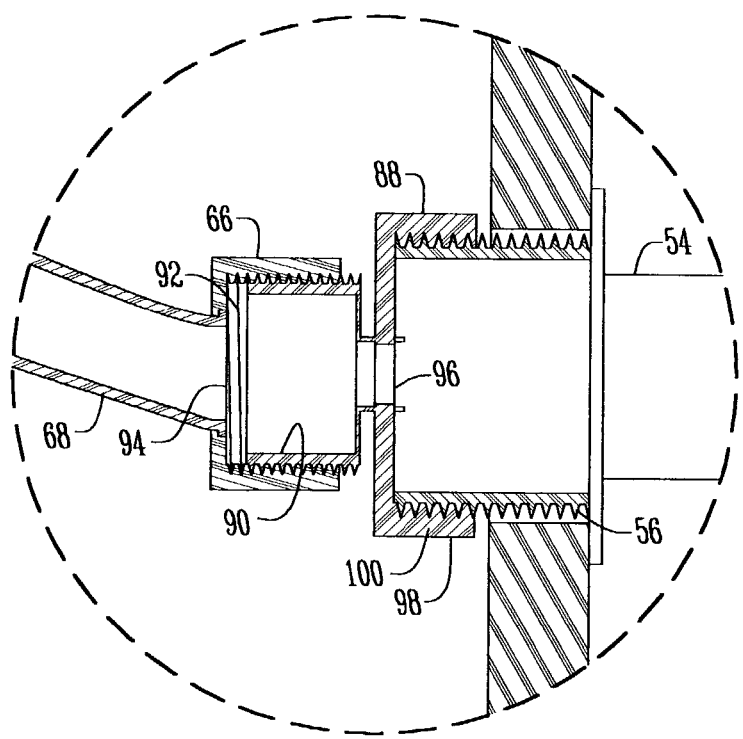
FIG. 6A is an enlarged sectional side view of the drain adapter of this invention for use with an overflow drain taken on line 6—6 of FIG. 5.

With reference to FIGS. 5 and 6A, the adapter 88 has a hose end fitting 90 with a threaded portion 92 for removably securing the adapter 88 to the threaded surface 67 of lower connector 66 to form a watertight seal. An inlet 94 of the adapter 88 is secured in fluid flow communicating with the hose 68 via hose end fitting 90. The adapter 88, further has an outlet 96 which is secured in fluid flow communicating with the overflow drain 54 by overflow end fitting 98. The overflow end fitting 98 has a threaded portion 100 for removably securing the adapter 88 to the threaded surface 56 of overflow drain 54 to form a watertight seal.

Referring to FIGS. 1, 2, and 5, in operation, drains 20, 24, 28, 32, 36, 40, and outlet 44 are all sealed from fluid flow. Then either bottom drain 16 or overflow drain 54 are left open and placed in fluid flow communication with first shower inlet 46. The non-selected drain (16 or 54) is sealed to fluid flow. The testing assembly 60 is secured in fluid flow communication between the shower inlet 46 and the selected drain (16 or 54), as shown in FIGS. 3 and 5. Fluid flow through shower inlet 46 is initiated to send fluid through assembly 60, though drain (16 or 54) and into the plumbing system 12. The plumbing system 12 is charged with water at some elevation above the drains 16, 20, 24, 28, 32, 36, 40, and 54 so that it can be determined if there are any leaks in the system. Having determined that there are no leaks in the system 12, the water is purged from the system, the assembly 60 is removed, drain blockers such as seal 58 are broken or removed, and finishing covers are placed on the plumbing fixtures.

It is therefore seen that this invention provides a testing assembly for pressure testing plumbing systems which eliminates the need to run water through the roof vent. The invention also provides a testing assembly which utilizes an inlet and a drain of a shower station to pressure test plumbing systems. In addition, the invention provides a drain adapter which allows for a watertight connection between a shower station inlet and drain.

It is therefore seen that this invention will accomplish at least all of its stated objectives.

I claim:

1. A testing assembly for pressure testing a plumbing system in a building where the building has a shower station with a shower inlet, the testing assembly comprising:
   an externally threaded tub overflow drain adapted to be placed in the shower station and in field communication with the plumbing system;
   a drain adapter having a hose end fitting and an overflow end fitting in fluid communication with the hose end fitting, the overflow end fitting being internally threaded to removably engage the externally threaded overflow drain to form a water tight seal;
   a hose fitting on the shower inlet; and
   a hose removably connecting the shower inlet and the drain adapter.

2. The testing assembly of claim 1, wherein the hose is removably connected to the drain adapter by a lower connector removably engaged with the hose end fitting of the drain adapter to form a watertight seal.

3. The testing assembly of claim 1, wherein the hose is removably connected to the shower inlet by an upper connector having a threaded surface adapted to removably engage the hose fitting to form a watertight seal.

* * * * *